United States Patent [19]

Deichert et al.

[11] 4,208,506

[45] * Jun. 17, 1980

[54] POLYPARAFFINSILOXANE SHAPED ARTICLE FOR USE IN BIOMEDICAL APPLICATIONS

[75] Inventors: William G. Deichert, Macedon, N.Y.; Kai C. Su, Arlington, Tex.; Martin F. vanBuren, Webster, N.Y.

[73] Assignee: Bausch & Lomb Incorporated, Rochester, N.Y.

[*] Notice: The portion of the term of this patent subsequent to May 8, 1996, has been disclaimed.

[21] Appl. No.: 14,188

[22] Filed: Feb. 22, 1979

Related U.S. Application Data

[63] Continuation-in-part of Ser. No. 878,831, Feb. 21, 1978, Pat. No. 4,153,641, which is a continuation-in-part of Ser. No. 818,783, Jul. 25, 1977, abandoned.

[51] Int. Cl.$^2$ .............................................. C08G 77/20
[52] U.S. Cl. ............................................. 528/32; 3/1; 3/1.4; 3/36; 128/130; 128/348; 128/349 R; 128/350 R; 128/260; 128/DIG. 21; 351/160 H; 528/12; 528/24; 528/26; 528/27; 528/37; 528/42; 526/279; 525/479; 433/228
[58] Field of Search ..................... 3/1.4, 1, 36; 32/1; 128/130, 348, 349 R, 350 R, 351, DIG. 21, 260; 351/160 H; 528/32, 33, 24, 12, 37, 42, 26, 27; 526/279; 260/827

[56] References Cited

U.S. PATENT DOCUMENTS

| | | | |
|---|---|---|---|
| 2,770,633 | 11/1956 | Sommer | 260/448.2 |
| 2,793,223 | 5/1957 | Merker | 260/448.2 |
| 2,865,885 | 12/1958 | de Benneville et al. | 260/46.5 |
| 2,906,735 | 9/1959 | Speier | 260/46.5 |
| 2,922,807 | 1/1960 | Merker | 260/448.2 |
| 3,041,362 | 6/1962 | Merker | 260/448.2 |
| 3,041,363 | 6/1962 | Merker | 260/448.2 |
| 3,228,741 | 1/1966 | Becker | 351/160 |
| 3,341,490 | 9/1967 | Burdick et al. | 260/37 |
| 3,518,324 | 6/1970 | Polmanteer | 260/825 |
| 3,763,081 | 10/1973 | Holub et al. | 260/37 SB |
| 3,808,178 | 4/1974 | Gaylord | 260/86.1 E |
| 3,828,263 | 4/1975 | Martin | 260/825 |
| 3,996,187 | 12/1976 | Travnicek | 260/37 SB |
| 3,996,189 | 12/1976 | Travnicek | 260/37 SB |
| 4,153,641 | 5/1979 | Deichert et al. | 260/827 |

OTHER PUBLICATIONS

Katz et al., J. Poly. Sci. Symposium, No. 46, pp. 139–148 (1974).
Katz et al., J. Poly. Sci., vol. 13, pp. 645–658 (1975).
Katz et al., J. Poly. Sci., vol. 16, pp. 597–614 (1978).
Piccoli et al., J. Am. Chem. Soc., vol. 82, pp. 1883–1885 (1960).
Frisch et al., Kinetics and Mechanisms of Polymerization, vol. 2, pp. 343–347, 356–357.
Merker, Journal of Polymer Science, vol. XLIII, pp. 297–310 (1960).

*Primary Examiner*—Melvyn I. Marquis
*Attorney, Agent, or Firm*—Ronald L. Lyons; Frank C. Parker

[57] ABSTRACT

Monomeric polyparaffinsiloxanes end-capped with activated unsaturated groups and polymers and copolymers thereof are disclosed herein for use as contact lenses and biomedical devices with improved properties, such as, oxygen transportability, hydrolytic stability, biological inertness, transparency and improved strength without the use of fillers. The polymer composition comprises a poly(organoparaffinsiloxane) monomer $\alpha,\omega$ terminally bonded through divalent hydrocarbon groups to polymerized free radical polymerizably activated unsaturated groups.

27 Claims, No Drawings

POLYPARAFFINSILOXANE SHAPED ARTICLE FOR USE IN BIOMEDICAL APPLICATIONS

CROSS-REFERENCE TO RELATED APPLICATIONS

This application is a continuation-in-part application of U.S. patent application Ser. No. 878,831 filed Feb. 21, 1978, now U.S. Pat. No. 4,153,641, which is a continuation-in-part application of U.S. patent application Ser. No. 818,783, filed July 25, 1977 and now abandoned.

BACKGROUND OF THE INVENTION

Field of the Invention

This invention relates to novel polymeric compositions and more particularly to biomedical devices made therefrom. These devices comprise fillerless, oxygen transporting, hydrolytically stable, biologically inert, transparent, biomedical devices prepared from the polymerization of monomers which are represented by the formula:

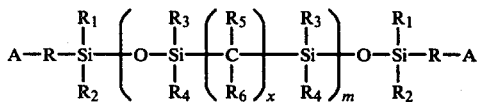

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

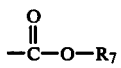

wherein $R_7$ is selected from the group consisting of a hydrocarbon group containing from 1 to about 12 carbon atoms and a carboxylic acid amide represented by the formula

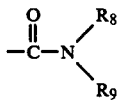

wherein $R_8$ and $R_9$ can be the same or different and each is selected from the group consisting of hydrogen and a hydrocarbon group containing from 1 to about 12 carbon atoms; x is 2 or greater and m is 1 or greater.

The invention further particularly relates to polymers and/or copolymers which comprise poly(organoparaffinsiloxanes) terminally bonded through divalent hydrocarbon groups to activated unsaturated groups copolymerized with monomers containing activated vinyl groups. The copolymers are optically clear and colorless. The polymers and copolymers described herein can be usefully employed for, as stated, making "hard" or "soft" contact lenses, intraocular implants, as well as other prostheses, more particularly "soft" contact lenses.

PRIOR ART STATEMENT

The use of siloxane polymers for the fabrication of optical contact lenses and biomedical devices is desirable. The desirability is due to the high oxygen transportability and generally the relative softness of polysiloxanes. The tear strength and tensile strength of polysiloxane elastomers, however, are generally poor and as a result fillers are employed to increase the strength of the elastomers. In U.S. Pat. Nos. 3,996,187, 3,996,189, 3,341,490 and 3,228,741 there are described contact lenses fabricated from poly(organosiloxanes) containing fillers. The tear strength and tensile strength of the contact lenses made from the instant polymer are of sufficient strength so that no fillers are required.

U.S. Pat. Nos. 3,996,187 and 3,996,189, as mentioned above, disclose contact lenses made from reinforced polysiloxanes. The lenses contain various polysiloxanes with index of refractions similar to the silica filler so that an optically clear silica filled silicone elastomer can be formed from aryl and alkyl siloxanes. The material contains from 5 to 20 percent silica. The silica is used, as mentioned, for strength. The instant invention contains no fillers for strength since the instant material has sufficient strength without fillers.

U.S. Pat. No. 3,341,490 discloses contact lenses made from blends of siloxane copolymers containing reinforcing silica fillers. As mentioned, the contact lenses or biomedical devices of the instant invention contain no fillers.

U.S. Pat. No. 3,228,741 discloses contact lenses made from silicone rubber particularly hydrocarbon substituted polysiloxane rubber. This silicone material contains fillers such as pure silica to control flexibility, pliability and resiliency of the lenses. The instant polymers require no fillers.

U.S. Pat. No. 3,808,178 discloses a polymeric material containing a polymethacrylate backbone with relatively short poly(organosiloxane) ester side chains on the backbone polymer There is no cross-linking involved in 3,808,178 since the monomers disclosed in 3,808,178 are monofunctional i.e. have only one functional group on each monomer. In order to get cross-linking in 3,808,178 it is taught at column 5 or 3,808,178 that different monomers must be added for cross-linking which have more than one functionality. However, in the instant invention cross-linking is obtained since each siloxane monomer is difunctional i.e. each monomer contains two functional groups, most preferably two methacrylate groups which results in cross-linking. Furthermore, contact lenses made from the polymers disclosed in 3,808,178 would not transport oxygen sufficiently whereas contact lenses made from the instant polymers would transport oxygen sufficiently to meet the requirements of the human cornea.

U.S. Pat. No. 3,518,324 teaches vulcanizing to make silicone rubber whereas the instant invention is concerned with contact lenses made from polymerizing specific monomers.

U.S. Pat. No. 3,878,263 teaches one configuration which may be

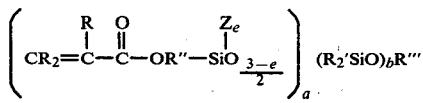

R(s) may be hydrogen or monovalent hydrocarbon radicals having from one to 12 carbon atoms.

R' may be a monovalent hydrocarbon radical or a cyanoalkyl radical having from one to 18 carbon atoms, R'' may be a divalent hydrocarbon radical having from one to 18 carbon atoms, R''' may be a radical selected from the group, R'''' $O_{0.5}$ and $R_3'SiO_{0.5}$. R'''' is selected from the groups consisting of hydrogen and monovalent hydrocarbon radicals.

c may equal zero but when c equals zero then Z must be OR''.

Z is an important ingredient since this is used to cross-link the chains. Z is a group selected from the class consisting of OR'''', R'''' or $OSiR''_3$. Therefore, the monomers of the instant invention are not taught in 3,878,263.

U.S. Pat. No. 2,770,633 discloses 1,3-bis(4-methacryloxybutyl) tetramethyl disiloxane, one of the preferred monomers used in the instant invention. This is taught at column 1, line 63 or 2,770,633 when R equals vinyl. However, 2,770,633 teaches only the monomer whereas the instant invention teaches not only the monomer but the polymer. In fact, 2,770,633 would not want the monomer to polymerize since it would not perform its function as a lubricant if polymerized.

U.S. Pat. No. 2,906,735 teaches a reaction between an alkyl siloxane and acrylic acid or a methacrylic acid resulting in a disiloxane terminated by acrylate groups. 2,906,735 does not teach the polymers of the instant invention.

U.S. Patent No. 2,922,807 discloses disiloxanes having acryloxy or methacryloxy groups attached to the silicone through a divalent alkylene radical of from 2 to 4 carbon atoms.

U.S. Pat. No. 3,763,081 discloses, in pertinent part, the polymerization of an unsaturated siloxane which is somewhat difficult to polymerize since a double bond in this type of monomer generally is not very active. One must use both high temperatures and a peroxide catalyst or a platinum catalyst in order to complete this type of reaction. See, for example, 3,763,081 at column 4, lines 35–46. In the instant reaction the monomeric materials are referred to specifically as having activated unsaturated groups bonded through a divalent hydrocarbon group to the siloxane whereas 3,763,081 has no activated unsaturated groups bonded to the siloxane.

U.S. Pat. No. 2,865,885, in pertinent part, teaches a vinyl group which is not activated as shown in column 1, lines 25-30 of 2,865,885. The reason 2,865,885's double bond is not "active" in the sense as defined in the instant application is that the double bond is bonded to either sulfur or oxygen. In the instant invention this same position would have a

carbonyl group. This would make the double bond active as defined in the instant application. Therefore, in 2,865,885 since the reactivity ratios are so different i.e. the double bond is not active in 2,865,885 as defined in the instant invention, it would be very difficult to get an acceptable copolymerization reaction during using the formulae of 2,865,885 as compared to the active double bond in the instant invention which easily copolymerizes. In the instant invention the vinyl group is "activated" to facilitate free radical polymerization. The formula given at column 1, lines 25–30 of 2,865,885 does not lend itself to free radical polymerization due to the lack of resonance but rather it lends itself to ionic polymerization due to the polar nature of the substituents. Therefore, it would be extremely difficult, if at all possible, for 2,865,885 to form the compounds of the instant invention. Also the compounds formed in 2,865,885 are not hydrolytically stable because of the presence of the silicone-nitrogen bond in the formula. The instant invention cannot use a hydrolytically unstable compound. Furthermore, the products of this hydrolysis in 2,865,885 could be injurious to the human eye particularly the amines. Also at column 3 of 2,865,885 the linkage is an amine linkage to the double bond and in the instant invention this linkage is always an alkyl. Therefore, 2,865,885 does not teach the instant monomers.

U.S. Pat. No. 2,793,223, in pertinent part, at Example 5 at column 3, lines 30–41 teaches that a phenyl group is attached to the siloxane. That material would be very hard. Furthermore, contact lenses made from the polymers made from the monomers disclosed in 2,793,223, because of the presence of the phenyl group on the siloxane as shown in Example 5 of 2,793,223, would not transport oxygen sufficiently whereas contact lenses made from the instant polymers would transport oxygen sufficiently to meet the requirements of the human cornea.

Katz and Zewi, "Correlations Between Molecular Structure and Some Bulk Properties of Highly Crosslinked Polysiloxanes", J. Polymer Sci., Vol. 46, Pages 139–148 81974) teaches, in pertinent part, that divinyl monomers can be prepared by esterification of the carboxyl-terminated compounds with two molecules of a monoester of ethylene glycol and acrylic acid. Polymerization can be effected by ultraviolet radiation at room temperature. Also taught is the structure as shown on page 146 of the Katz et al article. If this formula was broken down as it relates to the material taught in the instant application, the formula would be as follows:

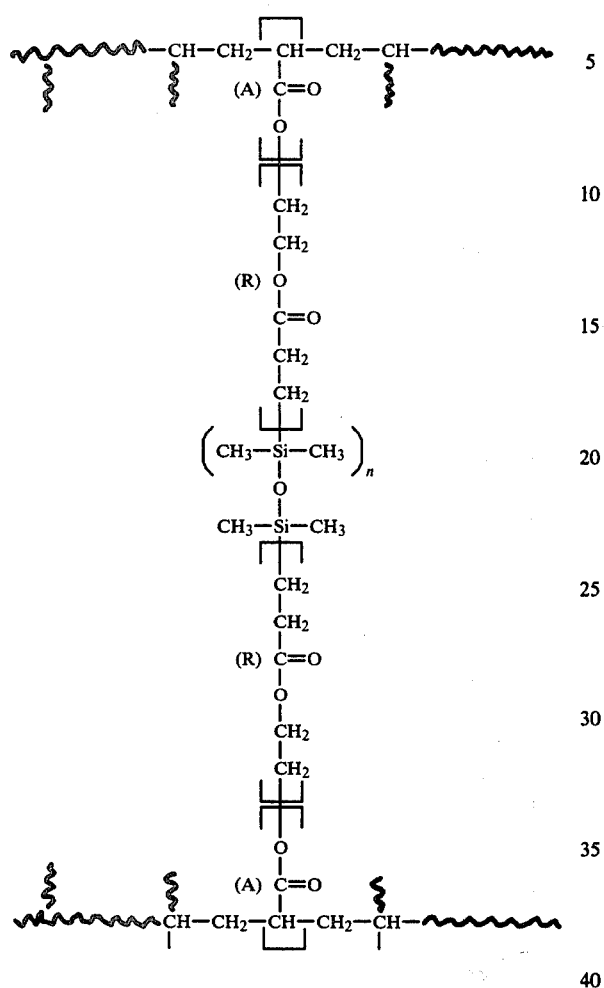

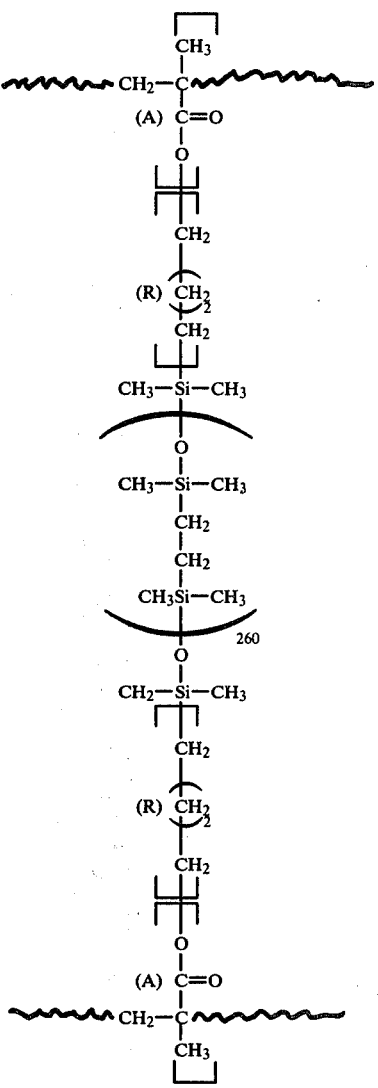

In the above formula the R group has an ester linkage whereas in the instant material the R is a hydrocarbon group.

Also in the above formula the center repeating unit is a dimethyl siloxane unit whereas the center repeating unit in the instant material is a paraffin siloxane repeating unit as illustrated below. The R linkage in the Katz et al paper is not as hydrolytically stable as the hydrocarbon linkage in the instant polymer. The ester group in Katz et al can be hydrolyzed. This stability is important if this material is to be used in soft contact lenses or biomedical devices since these types of devices are usually heated in order to disinfect them. As mentioned, if the contact lens loses its shape, then it loses its optics. It should be understood that the instant material does have an ester linkage. However, this linkage is between the A and the R groups. It is actually located in the A group as illustrated below by a formula of one of the most preferred embodiments of the instant invention.

This Katz et al reference, in addition to teaching the specific formula on page 146, merely teaches that phase differences are detectable as the siloxane chain length is decreased. As the siloxane chain increases in length, Katz et al teaches that the phase differences are lost and these differences merge into one continuous transition.

In addition to the above, it is important to note that Katz et al does not suggest any usage for this material.

Katz and Zewi "Some Rheological Properties of Highly Crosslinked Polysiloxanes" *J. Polymer Sci.* Vol. 13, Pages 645-658 (1975) teaches, in pertinent part, the same materials as taught in the above cited (1974) article by Katz et al. This article teaches in more detail the steps necessary in order to make the starting materials for the polymer as taught in the 1974 article. Katz et al. is teaching in this article, in pertinent part, how to synthesize the carboxyl terminated siloxane. This is illustrated on pages 646-647. Katz et al then crosslinks this using a different chemical reaction than in the instant application in order to make the polymer as shown on page 649. This polymer is not related in any way to the instant materials. In addition to the above, it is important to note that this Katz et al reference also makes no mention of any uses of the material.

Katz and Zewi "Microheterogeneity in Crosslinked Polysiloxane" *J. Polymer Sci.* Polymer Chemistry Edition, volume 16, pages 597–614 (March, 1978) teaches, in pertinent part, the same materials as taught in the above cited (1974) and (1975) articles by Katz et al. The only new material mentioned appears on page 598, line 8 i.e. crosslinked polyesters. However, these crosslinked polyesters are not pertinent to the instant application. Katz et al is teaching in this article, in pertinent part, how to prepare certain monomers. Katz et al. is merely suggesting the same crosslinked material as he suggested in his earlier (1974) and (1975) articles. Katz et al then discusses the physical properties and the microheterogeneity of these crosslinked polymers. He discusses the difference in the phase separation on the submicroscopic scale. As to the physical properties, which Katz et al mentioned in his article on page 597, he discusses the physical properties in general of polysiloxanes. Katz et al discusses specific properties of his polymers at page 609 where he presents modulus-temperature data. Then he discusses crosslinking efficiency on page 607. He is measuring properties which will give him an idea of his efficiency of crosslinking. Again, it should be stated that Katz et al in this (1978) article teaches no more material than he taught in his earlier articles except for the disclosure of the crosslinked polyesters on page 598. However, these materials are not relevant to the instant application. In addition to the above, it is important to note that this Katz reference also makes no mention of any uses of this material except as possible sealants.

W. A. Piccoli, G. G. Haberland and R. L. Merker, *J. Am. Chem. Soc.* "Highly Strained Cyclic Paraffin-Siloxanes" Vol. 82, p. 1883–1885 (Apr. 20, 1960) teaches, in pertinent part, the preparation of the cyclic paraffin-siloxane monomers which may be used in the instant invention to make the prepolymers of the instant invention. These prepolymers i.e. linear monomers, in the instant invention are then crosslinked to form the polymers used for making contact lenses. It is disclosed on page 1884, column 2, lines 15–27, of the above article that these cyclic paraffin-siloxane monomers may be polymerized using strong acids or bases to form linear polymers. The linear polymers, as mentioned, are used in the instant invention as prepolymers and crosslinked to form materials for making contact lenses. Nowhere does the article disclose or suggest the crosslinked polymers of the instant invention. Neither does the article suggest or disclose that the polymers can be used to make contact lenses.

R. L. Merker and M. J. Scott *J. of Polymer Sci.*, "The Copolymerization of Cyclic Siloxanes" Vol. 43, p. 297–310 (1960) teaches, in pertinent part, copolymerization studies using cyclic alkyl siloxanes. These materials are copolymerized with silethylene siloxane and then the rates of polymerization are determined. The silethylene siloxane is used because it does not equilibrate between the ring form and the linear form. Once the ring form is broken the ring stays open, that is, the reaction is kept going in one direction. The crosslinked polymers of the instant invention are not suggested or taught by this article nor is the use of these polymers as contact lenses taught or suggested.

U.S. Pat. Nos. 3,041,362 and 3,041,363 teach, in pertinent part, the same materials as taught in the above mentioned articles coauthored by Merker in the *J. Am. Chem. Soc.* and *J. of Polymer Sci.* However, in addition, it is taught that some polyfunctional siloxanes may be used with the monomers to give crosslinked polymers and copolymers. However, the crosslinked polymers used in the instant invention are not taught or suggested by these references nor are the polymers which are taught by these references ever relevant to the instant polymers. Furthermore, it is not taught or suggested by these references that these polymers could be used as contact lenses.

E. E. Bostick, *Kinetics and Mechanisms of Polymerization* Vol. 2 (1969) Frisch and Regan, ed. Chapter 8 "Cyclic Siloxanes and Silazanes" p. 343–357, teaches, in pertinent part, siloxane polymerization using cyclic siloxanes. This article teaches no more than the above mentioned article from *J. of Polymer Sci.* by R. L. Merker and M. J. Scott.

E. E. Bostick, *Chemical Reactions of Polymers*, High Polymers series vol. 19 (1964) E. M. Fettes, ed. chapter 7 "Interchange Reactions" section B "Silicones" p. 525 teaches, in pertinent part, siloxane copolymerization using cyclic siloxanes. It teaches that these reactions go in one direction. This article teaches no more than the above mentioned article from *J. of Polymer Sci.* by R. L. Merker and M. J. Scott.

None of the above patents or publications teach the instant invention, much less the preferred reactions of the instant invention. Furthermore, and most importantly, none of the prior art teaches novel contact lenses or biomedical devices of the instant invention made from the instant polymers.

SUMMARY OF THE INVENTION

The present invention provides materials which can be usefully employed for the fabrication of prostheses, such as, heart valves, intraocular lenses and contact lenses.

In one embodiment of this invention is provided fillerless, oxygen transporting, hydrolytically stable, biologically inert, transparent, shaped article for use in biomedical applications including contact lenses comprising a crosslinked polymer made from poly(organoparaffinsiloxane) monomers represented by the following formula:

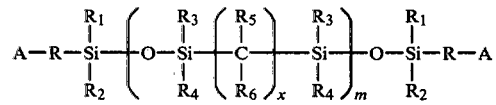

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

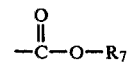

wherein $R_7$ is selected from the group consisting of a hydrocarbon group containing from 1 to about 12 carbon atoms and a carboxylic acid amide represented by the formula

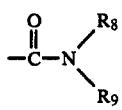

wherein $R_8$ and $R_9$ can be the same or different and each is selected from the group consisting of hydrogen and a hydrocarbon group containing from 1 to about 12 carbon atoms; x is 2 or greater than m is 1 or greater.

When the terms "activated" or "free radical polymerizably activated" are used with the term "unsaturated groups" herein, it is meant that an unsaturated group which is activated is one which has a substituent which facilitates free radical polymerization. These activated unsaturated groups are polymerized to form the polymers of the instant invention. Preferably, the activating groups used herein lend themselves to polymerization under mild conditions, such as, ambient temperatures.

When the statement is made "a poly(organoparaffinsiloxane) monomer α,ω terminally bonded through divalent hydrocarbon groups to polymerized free radical polymerizably activated unsaturated groups" it is meant that the poly(organoparaffinsiloxane) compound as described herein has been attached to a compound having a divalent hydrocarbon group, such as, methylene or propylene etc. and then at each end of this compound is attached an activated unsaturated group such as methacryloxy etc. and this then is the most preferred monomer. When the monomers are polymerized e.g. crosslinked, the activated unsaturated groups are polymerized. Then the monomers form three dimensional polymers or copolymers which are the materials of which the biomedical devices including contact lenses are made.

The monomers employed in accordance with this invention, as a result of the presence of the activated unsaturated groups, are readily polymerized to form three dimensional polymeric networks which permit the transport of oxygen and are optically clear, strong and can be made, as desired, soft or hard.

When the term monomer is used herein we mean to include polyparaffinsiloxanes end-capped with polymerizable unsaturated groups. The process of lengthening the paraffin siloxane portion of the monomer is referred to herein as siloxane ring insertion. The chain length of the poly(paraffinsiloxane) center unit of the monomers may be as high as 800 or more.

When the term polymerization is used herein we refer to the polymerization of the double bonds of the polyparaffinsiloxanes end-capped with polymerizable unsaturated groups which results in a crosslinked three dimensional polymeric network.

The relative hardness (or softness) of the contact lenses, i.e. polymer of this invention can be varied by decreasing or increasing the molecular weight of the monomeric poly(organoparaffinsiloxane) end-capped with the activated unsaturated groups or by varying the percent and type of the comonomer. As the ratio of organoparaffinsiloxane units to end cap units increases, the softness of the material increases. Conversely, as this ratio decreases the rigidity and hardness of the material increases.

More preferably, there is provided a fillerless, oxygen transporting, flexible, hydrolytically stable, biologically inert, transparent, resilient, soft, polymeric shaped article for use in biomedical applications including contact lenses comprising a poly(organoparaffinsiloxane) made from a poly(organoparaffinsiloxane) monomer represented by the following formula:

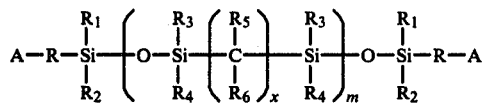

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

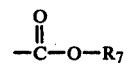

wherein $R_7$ is selected from the group consisting of a hydrocarbon group containing from 1 to about 12 carbon atoms and a carboxylic acid amide represented by the formula

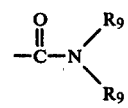

wherein $R_8$ and $R_9$ can be the same or different and each is selected from the group consisting of hydrogen and a hydrocarbon group containing from 1 to about 12 carbon atoms; x is 2 or greater and m is 1 or greater. A contact lens may be formed from the above material by spin-casting, if desired, such as taught in U.S. Pat. No. 3,408,429.

In another embodiment of this invention there are provided materials which may be polymerized which comprises a poly(organoparaffinsiloxane) monomer represented by the following formula:

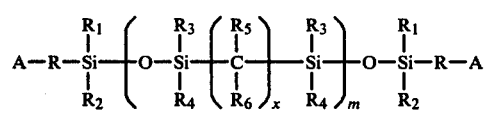

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

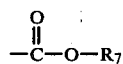

wherein R₇ is selected from the group consisting of a hydrocarbon group containing from 1 to about 12 carbon atoms and a carboxylic acid amide represented by the formula

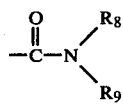

wherein R₈ and R₉ can be the same or different and each is selected from the group consisting of hydrogen and a hydrocarbon group containing from 1 to about 12 carbon atoms; x is 2 or greater and m is 1 or greater copolymerized with one or more monomers which can be one of lower esters of acrylic or methacrylic acid, styryls, allyls or vinyls forming a copolymer is a crosslinked network. The copolymers are in the form of three dimensional networks which are clear, strong and can be usefully employed in providing films, and shaped bodies such as contact lenses.

The novel copolymers of this invention can comprise 10 to 90 parts by weight of one or more of the monomers of organoparaffinsiloxanes described herein and 90 to 10 parts by weight of the polymerizable monomers. The preferred biomedical devices, including contact lenses formed from these copolymers, are fillerless, oxygen transporting, flexible, hydrolytically stable, biologically inert, transparent, resilient and soft.

The three-dimensional network polymer products of this invention are readily prepared by means of conventional free radical polymerization techniques. The monomers of organosiloxane alone or in the presence of comonomers together with about 0.05 to about 4 percent, preferably 0.05 to 2 percent by weight of a free radical initiator may be heated to a temperature of about 30° C. to about 100° C. to initiate and complete the polymerization. The polymerizable monomers i.e., the poly(organoparaffinsiloxanes), with or without comonomers can preferably be subjected at room temperature to irradiation by UV light in the presence of suitable activators such as benzoin, acetophenone, benzophenone and the like for a sufficient time so as to form a three dimensional polymer network.

The polymerization can be carried out directly in contact lens molds or can be cast into discs, rods or sheets which can then be fabricated to a desired shape. Preferably the polymerization is carried out while the material is being spin cast such as taught in U.S. Pat. No. 3,408,429.

As is well established, the oxygen transportability of polysiloxanes is substantially greater in comparison to the conventional contact lens polymers such as polymethyl methacrylate (PMMA) or polyhydroxyethylmethacrylate (PHEMA). The oxygen transportability of the materials of this invention can be varied by altering the percentage of siloxane units. For example, a high percentage of siloxane units results in a product more capable of transporting oxygen as compared with a lower percentage of siloxane units which results in a material with less ability to transport oxygen.

DESCRIPTION OF PREFERRED EMBODIMENTS

In accordance with one embodiment of this invention shaped articles for use in biomedical applications including contact lenses are provided which are fabricated from three-dimensional network polymerizates of poly(organoparaffinsiloxanes) α,ω terminally bonded through divalent hydrocarbon groups to polymerized free radical polymerizably activated, unsaturated groups forming polymers in a crosslinked network. The poly(organoparaffinsiloxanes) i.e. monomers, employed are of the formula:

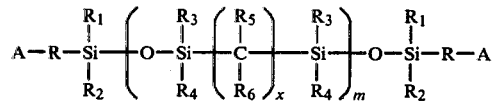

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

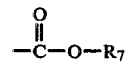

wherein R₇ is selected from the group consisting of a hydrocarbon group containing from 1 to about 12 carbon atoms and a carboxylic acid amide represented by the formula

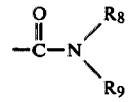

wherein R₈ and R₉ can be the same or different and each is selected from the group consisting of hydrogen and a hydrocarbon group containing from 1 to about 12 carbons atoms; x is 2 or greater and m is 1 or greater.

Desirably m can be in the range of 50 to about 200. However, the range of m can be greater such as preferably 50 to 800. However, m can be greater than 800. Should one desire to obtain a harder contact lens m should be less than 25.

Preferably x is 2 to 10 and most preferably x is 2 to 3.

When the term "soft" is used herein to describe the biomedical devices of the instant invention including contact lenses it is meant that m, in the above formula, after polymerization, is more than 25, preferably from about 50 to about 800. When the term "hard" is used herein to describe the contact lenses or the biomedical devices of the instant invention, it is meant that m, in the above formula, after polymerization, is less than 25.

Preferably A is one of 2-cyanoacryloxy

-continued

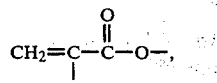
acrylonitryl

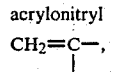
acrylamido

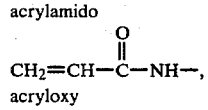
acryloxy

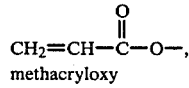
methacryloxy

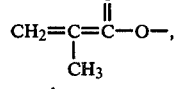
styryl

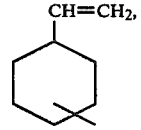

and
n-vinyl-2-pyrrolidinone-x-yl
wherein x may be 3, 4 or 5

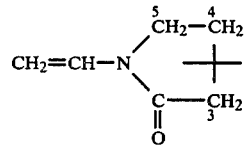

More preferably A is acryloxy or methacryloxy. However, other groups containing activated unsaturation can be readily employed, such groups being well known to those skilled in the art. Most preferably A is methacryloxy or acrylamido. R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R is an alkylene radical having about 1, 3 or 4 carbon atoms. Most preferably R is an alkylene radical having from about 3 to 4 carbon atoms e.g. butylene. Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as floromethyl and floropropyl. More preferably $R_1$, $R_2$, $R_3$ and $R_4$ are methyl radicals and phenyl radicals, most preferably $R_1$, $R_2$, $R_3$ and $R_4$ are methyl radicals.

Preferably $R_5$ and $R_6$ are selected from the group consisting of hydrogen, a hydrocarbon containing from 1 to about 6 carbon atoms and a carboxylic acid group. More preferably $R_5$ and $R_6$ are selected from the group consisting of hydrogen and methyl.

Preferably $R_7$ is a hydrocarbon group containing from 1 to about 6 carbon atoms. Most preferably $R_7$ is methyl.

Preferably $R_8$ and $R_9$ are selected from the group consisting of hydrogen and a hydrocarbon containing from 1 to about 4 carbon atoms. Most preferably $R_8$ and $R_9$ are selected from the group consisting of hydrogen and methyl.

The activated unsaturated group end-capped polyparaffinsiloxanes, i.e. monomers, employed in this invention can be prepared by equilibrating the appropriately substituted disiloxane, for example, 1,3-bis(4-methacryloxybutyl) tetramethyl disiloxane, with a suitable amount of cyclic paraffin-siloxanes as described in Piccoli, et al, *J. Am. Chem. Soc.*, "Highly Strained Cyclic Paraffin-Siloxanes" Vol. 82, p. 1883–1885 Apr. 20, 1960). The degree of softness, the physical properties such as tensile strength, modulus and percent elongation will determine the amount of cyclic organoparaffinsiloxane equilibrated with the disiloxane. By increasing the amount of cyclic paraffin siloxane one increases m.

The reaction between a cyclic paraffin-siloxane and disiloxanes, although not specifically disclosed for the disiloxanes employed in this invention as to provide the activated unsaturated groups as to the end caps for polyparaffinsiloxanes, is a conventional reaction and described by, for example, in Merker U.S. Pat. No. 3,041,362 issued June 26, 1962 incorporated herein by reference.

The following reactions represent the most preferred materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

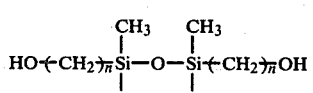

n preferably = 1, 3 and 4
n most preferably = 3 or 4

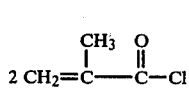

↓

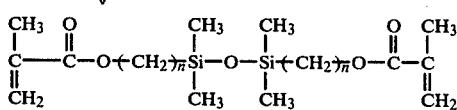

n preferably = 1, 3 or 4
n most preferably = 3 or 4

(2) Another most preferred method of preparing 1,3-bis (hydroxyalkyl) tetramethyl disiloxane dimethacrylates is by transesterification with methyl methacrylate:

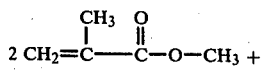

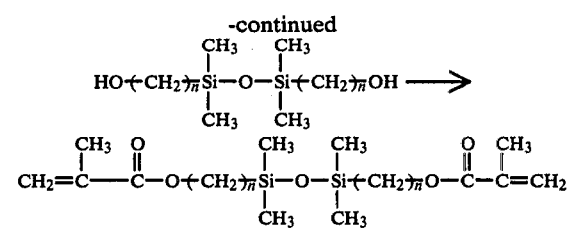

n preferably = 1, 3 or 4
n most preferably = 3 or 4

Then the paraffin-siloxane groups between the two methacrylate caps can be inserted by a ring opening insertion reaction with 1,1,3,3-tetramethyl-1,3-disila-2-oxacyclopentane as follows:

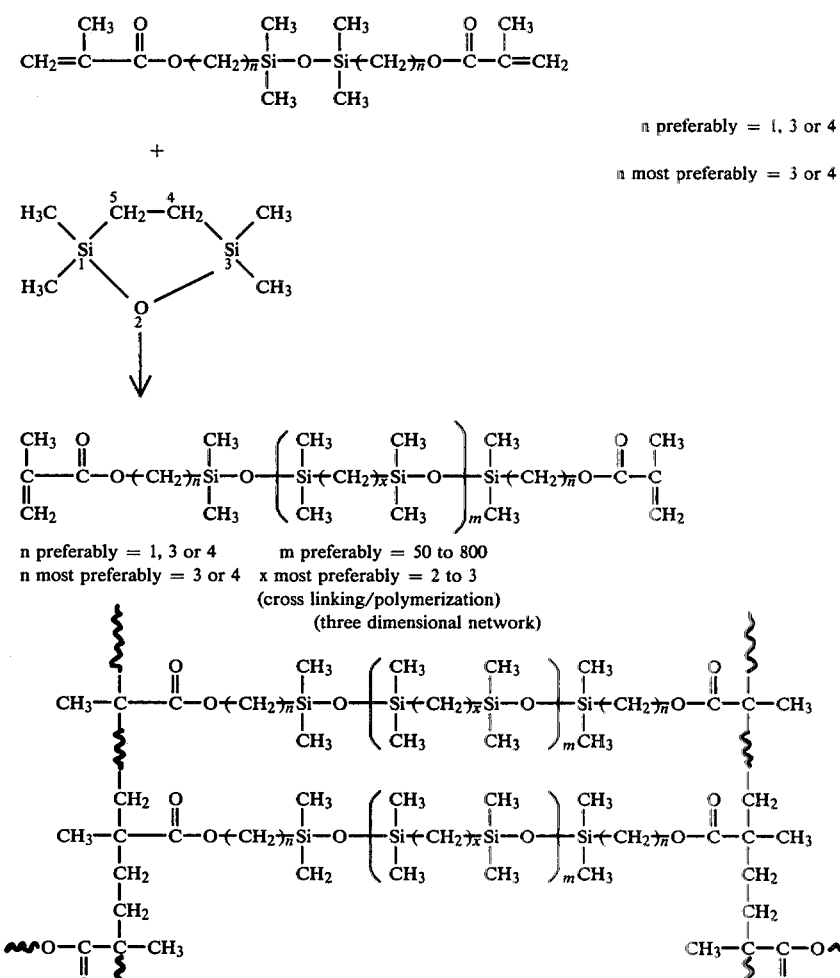

n preferably = 1, 3 or 4
n most preferably = 3 or 4
m preferably = 50 to 800
x most preferably = 2 to 3

The poly(organoparaffinsiloxanes) made from the monomers of this invention are generally clear, colorless liquids whose viscosity depends on the value of m. These monomers can be readily cured to cast shapes by conventional methods such as UV polymerization, or through the use of free radical initiators plus heat. Illustrative of free radical initiators which can be employed are bis(isopropyl) peroxydicarbonate, azobisisobutyronitrile, acetyl peroxide, lauroyl peroxide, decanoyl peroxide, benzoyl peroxide, tertiarybutyl peroxypivalate and the like.

In order to further control the properties of the polymers of the instant invention one can polymerize a mixture of the monomers comprising monomers having a low value of m and monomers having a high value for m. When m has a low value i.e., below 25, the resulting contact lenses or biomedical devices i.e. polymers, are relatively hard, oxygen transporting, hydrolytically stable, biologically inert, transparent and do not need fillers to improve the mechanical properties. The monomers have a relatively low molecular weight and as a result the viscosity is low enough e.g. about 3 centistokes so that the lenses may be made easily by spin casting. When m has a relatively high value i.e., above 25, the resulting contact lenses or biomedical devices i.e. polymers, become relatively soft, oxygen transporting, flexible, hydrolytically stable, biologically inert, transparent, resilient, and not need fillers to improve the mechanical properties. The monomers should have preferably a molecular weight low enough so that the viscosity is low enough to spin cast the monomers e.g. about 175 stokes or below measured in Gardner viscosity tubes. Preferably m is about 50 to 800.

In accordance with another embodiment of this invention there are provided polymers of monomers which are poly(organoparaffinsiloxane) terminally bonded through divalent hydrocarbon groups to activated unsaturated groups copolymerized with monomers containing an activated vinyl group.

The comonomer can be any polymerizable monomer which readily polymerizes by free radical polymerization and preferably is a monomer containing an activated vinyl group. Through the addition of comonomers one can enhance particular desirable properties. For example, buttons fabricated from copolymers of the instant monomers of the poly(paraffin siloxanes) and tetrahydrofuryl methacrylate can be more easily lathed into contact lenses as compared with buttons i.e. polymers, made from monomeric poly(paraffin siloxanes) alone. Wettability of contact lenses i.e. polymers, fabricated from the poly(paraffin siloxanes) can be substantially increased by copolymerizing the instant monomers with N-vinyl pyrrolidone.

Illustrative of comonomers which can be usefully employed in accordance with this invention are:

The derivatives of methacrylic acid, acrylic acid, itaconic acid and crotonic acid such as:

methyl, ethyl, propyl, isopropyl, n-butyl, isobornyl, menthyl, adamantanyl, isopinocamphyl, hexyl, heptyl, aryl, allyl, cyclohexyl, 2-hydroxyethyl, 2 or 3-hydroxypropyl, butoxyethyl, methacrylates; and propyl, isopropyl, butyl, isobornyl, methyl, adamantanyl, isopinocamphyl, hexyl, 2-ethyl hexyl, heptyl, aryl, acrylates; and propyl, isopropyl, butyl, hexyl, 2-ethyl hexyl, heptyl, aryl, itaconates; and propyl, isopropyl, butyl, hexyl, 2-ethyl hexyl, heptyl, aryl, crotonates.

Mono or di esters of the above mentioned acids with polyethers of the below general formula may be used:

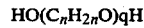

$HO(C_nH_{2n}O)_qH$ wherein n is a number of from 1 to about 12, preferably 2 or 3, and q is a number of from 2 to about 6 preferably 2 to 3.

Other comonomers may include:

styryls, such as, tertiary butyl styrene, propyl styrene, styrene, divinyl benzene, vinyl ethyl benzene, vinyl toluene etc.

Allylic monomers, such as, diallyl diglycol dicarbonate, allylcyanide, allyl chloride, diallyl phthalate, allyl bromide, diallyl fumarate and diallyl carbonate may be used.

Nitrogen containing monomers can be also used, such as:

n-vinyl pyrrolidone, 3-oxybutyl acryamide, etc.

The lower the value of m in the formula for the instant monomers the more compatible are the monomers with the above mentioned comonomers.

The advantages of using the biomedical devices especially contact lenses i.e. polymers, of the instant invention which are made from the monomers disclosed herein are numerous. For example, (1) the advantages of using activated vinyl terminal groups to cure the paraffin siloxane material are (a) the high reactivity systems permit rapid cure at room temperature if suitable initiators are used. Room temperatures are preferred. This is desirable since the preferred method of casting the contact lens is spin casting. (b) No fillers are needed to get useful physical strength as is common with most silicone resins. This is desirable since the use of fillers requires that other possibly undesirable materials be added to the composition in order to correct the refractive index of the contact lenses. (2) Furthermore, the biomedical devices made from the polymer of the instant invention are oxygen transporting. This is important if the material is to be used for contact lenses. The human cornea requires about $2 \times 10^{-6}$ cm$^3$/ (sec. cm$^2$ atm.) of oxygen through the contact lens as reported by Hill and Fatt, *American Journal of Optometry and Archives of the American Academyl of Optometry*, Vol. 47, p. 50, 1970. When m is at least about 4 the chain of paraffin siloxane is long enough in the instant composition to exceed the oxygen transportability requirements of the cornea and other living tissue. However, in specific situations m may be as low as 1. Because of the unique properties of the contact lenses or biomedical devices i.e. polymers, of the instant invention m may be great enough to allow sufficient oxygen transportability and at the same time will retain its desirable properties of elasticity, tear resistance, flexibility, resilience and softness.

When the term oxygen transportability or oxygen transporting is used in the instant application it is meant that the material will allow sufficient transmission of oxygen through itself to supply the necessary oxygen requirements of the human cornea and other living tissue. The oxygen requirement for the human cornea, as mentioned, is about $2 \times 10^{-6}$ cm$^3$/ (sec. cm$^2$ atm.). The oxygen transportability was determined by a special test procedure described in conjunction with Example III herein. (3) These lenses and biomedical devices are hydrolytically stable meaning that when the contact lenses or devices are placed into an aqueous solution, e.g., in the eye, or during the disinfecting step, i.e. water plus heat, the lenses or devices will not change in chemical composition, i.e. hydrolyze and cause the lenses or the devices to change shape resulting in an undesirable change in optics or shape. (4) The more preferred contact lenses or biomedical devices of the instant invention are also resilient. When the term resilient is used herein it is meant that after the lenses or biomedical devices have been deformed the lenses or devices will return quickly to their original shape. (5) The lenses are preferably made by spin casting, e.g. by the method as disclosed in U.S. Pat. No. 3,408,429. Monomers which have too high a viscosity cannot be spin cast. However, generally the higher the molecular weight of the monomers the longer the chain length, i.e. the larger the value of m, and as a consequence the more desirable the properties are for the preferred contact lenses i.e. polymers, of the instant invention, made from these monomers. The longer the chain length and the higher the molecular weight the higher the viscosity of the monomers. However, if spin casting is to be used the viscosity of the monomers must be such that these materials can be spin cast. The monomers of the instant invention can have molecular weights high enough to give all the desirable properties when polymerized but low enough to be spin cast while still in the monomeric form. The preferred weight average molecular weight is from about 4,000 to 60,000 for the monomers of the instant invention. (6) The most preferred contact lenses or biomedical devices of the instant invention should be soft. By the use of the term "soft" in the instant application it is meant in the preferred embodiment that the lenses or device should have a Shore hardness of about 60 or below on the A scale. (7) The preferred contact lenses or biomedical devices of the instant invention should be flexible. When the term "flexible" is used herein, it is meant that the contact lens or biomedical device is capable of being folded or bent back upon itself without breaking.

The most preferred contact lens or biomedical device of the instant invention is a fillerless, oxygen transporting, flexible, hydrolytically stable, biologically inert, transparent, resilient, soft, polymeric contact lens or shaped article for use in biomedical applications comprising a poly(organoparaffinsiloxane) monomer α,107 terminally bonded through divalent hydrocarbon groups to polymerized free radical polymerizably activated unsaturated groups. The poly(organoparaffinsiloxane) monomer used to make the polymer from which the contact lens or biomedical device is made has the preferred formula

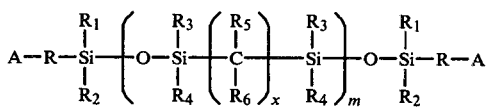

wherein A is selected from the group consisting of methacryloxy and acryloxy; R is an alkylene radical having from 3 to 4 carbon atoms; $R_1$, $R_2$, $R_3$ and $R_4$ can be the same or different and are monovalent hydrocarbon radicals having from 1 to about 12 carbon atoms; $R_5$ and $R_6$ are hydrogen atoms, x is 2 or 3 and m is 50 to 800.

The most preferred contact lenses or biomedical devices, i.e. polymers, of the instant invention, as mentioned, are fillerless, have an oxygen transport rate of at least about $2 \times 10^{-6}$ cm$^3$/(sec. cm$^2$ atm.), are hydrolytically stable, biologically inert, transparent, resilient, and have a softness preferably of about 60 or below on the Shore hardness A scale. Most preferably the Shore hardness should be 25 to 35 on the A scale.

To further illustrate the most preferred contact lenses or biomedical devices of the instant invention's physical properties, the tensile modulus of elasticity should be about 400 g/mm/mm$^2$ or less. If the material is to be used as contact lenses then the Shore hardness and modulus may be related to the comfort of the lenses to the wearer when used on the human eye.

Another advantage of the preferred embodiment i.e. soft contact lenses, of the instant invention is that lenses made from the polymers of the instant invention can be made large enough to cover the entire cornea of the eye resulting in more comfort. Hard contact lenses, such as PMMA lenses, have to be made smaller due to their poor oxygen transportability. Furthermore, the larger the lenses, the easier it is to locate the optical center of the lenses. The larger the lens the easier it is to maintain the optical axis which is required in making special lenses for people with particular eye problems, e.g., for those persons with astigmatism. Another advantage of the preferred soft lenses of the instant invention is that the instant preferred soft lenses have a softness similar to HEMA lenses but in addition, and most importantly, are more oxygen permeable, i.e are capable of transporting more oxygen. HEMA lenses are not oxygen permeable or capable of transporting oxygen to a degree necessary to meet all the requirements of the human cornea.

When the word "oxygen permeable" is used herein it means that the instant biomedical polysiloxane material will transport oxygen at a rate of at least about $2 \times 10^{-6}$ cm$^3$/(sec. cm$^2$ atm.).

While the polyparaffinsiloxane of the instant invention can be used to prepare contact lenses these polymers and copolymers, as mentioned, can also be employed for other uses, such as, shaped articles for use in biomedical applications. These polymers and copolymers can be used to make biomedical devices i.e. shaped articles, such as dialyzer diaphragms, to prepare artificial kidneys and other biomedical implants, such as disclosed in Wichterle, U.S. Pat. Nos. 2,976,576 and Wichterle. The instant polymers and copolymers can be used in preparing therapeutic bandages as disclosed in Shephard, U.S. Pat. No. 3,428,043. The instant polymers and copolymers can also be used in preparing medical surgical devices e.g. heart valves, vessel substitutes, intrauterine devices, membranes and other films, dialyzer diaphragms, catheters, mouth guards, denture liners and other such devices as disclosed in Shephard U.S. Pat. No. 3,520,949 and Shephard 3,618,231. The instant polymers and co-polymers can be used to modify collagen to make blood vessels, urinary bladders and other such devices as disclosed in Kliment U.S. Pat. No. 3,563,925. The instant polymers and co-polymers can be used to make catheters as disclosed in Shephard U.S. Pat. No. 3,566,874. The instant polymers and copolymers can be used as semipermeable sheets for dialysis, artificial dentures and all of such disclosures as set forth in Stoy U.S. Pat. No. 3,607,848. The instant polymers and copolymers can be used in making breathable leather and other materials as disclosed in Shephard, U.S. Pat. No. 3,660,218. The instant polymers and co-polymers can be used in ophthalmic prostheses and all other uses disclosed in Wichterle U.S. Pat. No. 3,679,504. The instant co-polymers and polymers can be used in making printing plates and for other similar type uses as disclosed in Takaishi U.S. Pat. No. 3,733,200.

When the terms "shaped article for use in biomedical applications" or "biomedical device" are used herein it is meant that the materials disclosed herein above physiochemical properties rendering them suitable for prolonged contact with living tissue, blood and the mucous membrane such as would be required for biomedical shaped articles, such as, surgical implants, blood dialysis devices, blood vessels, artifical ureters, artificial breasts tissue and membranes intended to come in contact with body fluid outside of the body, for example, membranes for kidney dialysis and heart/lung machines, and the like. It is known that blood, for example, is rapidly damaged in contact with artificial surfaces. The design of a synthetic surface which is antithrombogenic and nonhemolytic to blood is necessary for prosthesis and devices used with blood. The instant polymers and copolymers are compatible with living tissue.

The instant polymers and copolymers disclosed herein can be boiled and/or autoclaved in water without being damaged whereby sterilization may be achieved. Thus, an article formed from the instant polymers and copolymers disclosed herein may be used in surgery where an article compatible with living tissue or with the mucous membrane may be used.

The following examples are illustrative only and should not be construed as limiting the invention. All parts and percents referred to herein are on a weight basis and all viscosities measured at 25° C. unless otherwise specified.

EXAMPLE I 557 g 1,3-bis(4-hydroxybutyl) tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added drop wise. The mixture is agitated continuously overnight. The reaction solution is extracted consecutively with 10% water solutions of HCl and NH$_3$ in order to remove excess reagents and pyridine hydrochloride. The resulting solution of the product in hexane is dried with anyhydrous MgSO$_4$, filtered, and solvent removed at reduced pressure. About 459 g (55% yield) of 1,3-bis(4-methacryloxy butyl) tetramethyl disiloxane is collected. The structure is confirmed by infrared spectra, proton magnetic resonance spectra and elemental analysis. IR spectra shows no intense hydroxyl band between 3100 and cm$^{-1}$ but does show strong methacrylate absorptions at 1640 and 1720 cm$^{-1}$. PMR spectra agreed with the proposed structure:

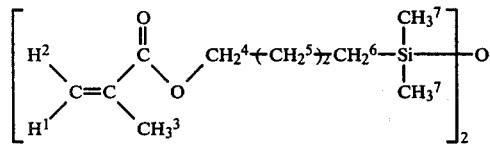

1,3-bis(4-methacryloxy butyl) tetramethyl disiloxane.

| Proton | ppm | Integrated Area | Multiplicity |
|---|---|---|---|
| H$^1$ | 7.0$_5$ | 1 | singlet |
| H$^2$ | 6.5$_0$ | 1 | singlet |
| H$^3$ | 3.0$_0$ | 3 | singlet |
| H$^4$ | 5.1$_5$ | 2 | triplet |
| H$^5$ | 2.7 | 4 | multiplet |
| H$^6$ | 1.6$_5$ | 2 | triplet |
| H$^7$ | 1.2$_0$ | 6 | singlet |

Elemental analysis gave 13.6% Si (calc. 13.5%), 58.1% C (calc. 57.9%, and 9.4%H (calc. 9.2%). The product was a clear, colorless, fragrant fluid.

EXAMPLE II 96.9 g. 1,1,3,3-tetramethyl-1,3-disila-2-oxacylclohexane available from Silar Labs, 10 Alplaus Road, Scotia, New York 12302, and 3.1 g. 1,3-bis(4-methacryloxybutyl) tetramethyl disiloxane as prepared in Example I are charged to a 200 ml round bottom polymerization flask.

1.3 ml. trifluoromethane sulphonic acid available from Aldrich Chemical Co. is added to the polymerization flask and the flask stoppered. An increase in the viscosity of the flask's contents and the evolution of heat are noted 2 to 3 minutes after the addition of the acid of the flask. The flask's contents are agitated on a shaker overnight. Next the polymerization is quenched by the addition of 10 g. Na$_2$CO$_3$. Hexane is added to the viscous product and the solution filtered to remove the carbonate. The hexane solution of the product is then washed three times with water and dried over MgSO$_4$. The hexane is removed from the product at reduced pressure. The viscosity of the product as measured with Gardner viscosity tubes is 9.0 stokes. The number average and weight average molecular weights as measured by gel permeation chromatography are 12,300 and 31,700 respectively. The structure of the clear colorless product is that of the following formula:

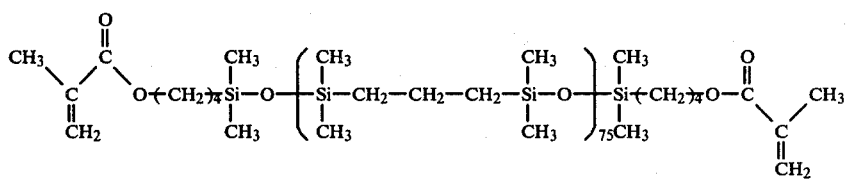

EXAMPLE III

Films of the viscous fluid as prepared in Example II are cast between glass plates using 1 weight percent diethoxyacetophenone as the curing agent. The films are cured by irradiating the assembled cells in ultraviolet light for 2 hours. Colorless, optically clear, odorless, elastic and strong films are obtained. The cured polymer is represented by the three dimensional network polymer below. The following physical properties are measured on an Instron Tester ASTM D 1708, no conditioning, using standard "dog bone" samples cut from 0.2 mm. thick films. The speed is 0.25 inches per minute.

In the case of modulus, it would be most preferred if the modulus is below 300 in order to obtain a soft contact lens. Therefore, generally the lower the modulus the softer the contact lens.

As to elongation, it is generally preferred that elongation be as high as possible.

As to oxygen transport, it is desirable that this rate be maximized. This rate should be greater than the rate of oxygen required by the human cornea.

| | |
|---|---|
| Tensile strength | 70 g/mm/mm$^2$ |
| Tensile modulus | 92 g/mm/mm$^2$ |
| Elongation | 118% |

(three dimensional network)

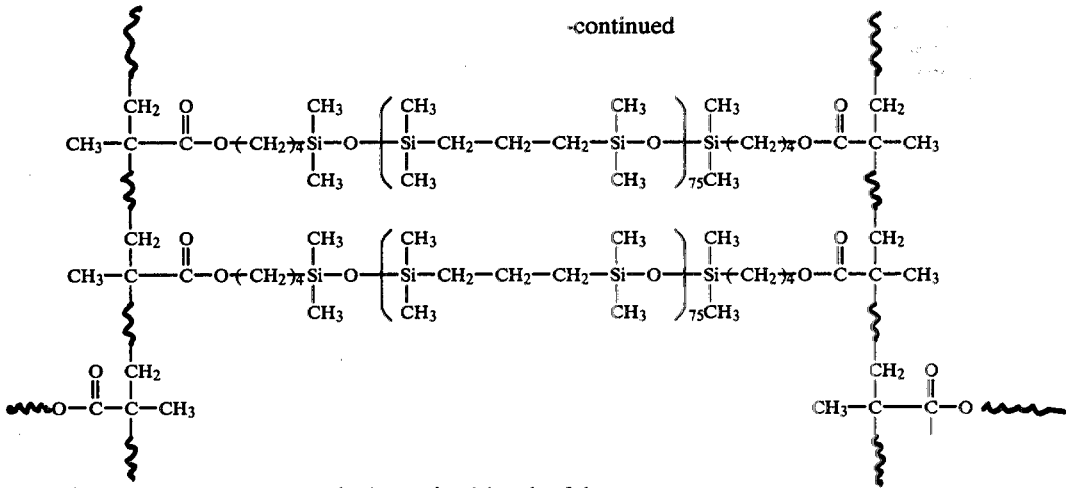

The oxygen transport rate is determined by the following technique. Two chambers are filled with water at 32° C. and are connected by a common passageway over which is placed the material to be tested. Nitrogen purged water is pumped into both chambers until the oxygen concentration is very low (~0.4 ppm). Then aerated water (oxygen concentration ~8 ppm) is introduced into the lower chamber. There is located in the upper chamber an electrode sensitive to oxygen concentration. This measures the apparent oxygen transport rate from the lower chamber through the material to be tested into the oxygen depleted upper chamber. The apparent oxygen transport rate of a membrane 0.1 mm thick as prepared in Example II is $1.9 \times 10^{-5}$ cm.$^3$(O$_2$)/sec. cm.$^2$ atm.

EXAMPLE IV

The viscous fluid product as prepared in Example II is mixed with 1 weight percent diethoxyacetophenone and placed in a suitable contact lens spin casting mold. It is spin cast under suitable polymerizable conditions such as taught in U.S. Pat. No. 3,408,429. The lens is optically clear, elastic and strong.

EXAMPLE V

The viscous fluid product as prepared in Example II is mixed with 30 weight percent t-butyl styrene and 0.5 weight % di(sec-butyl) peroxydicarbonate. Copolymer films of this mix are cast between glass plates. The films are cured by heating the assembled cells for ½ hour at 40° C. and then ½ hour at 60° C. and then ¼ hour at 80° C. The glass plates are separated. The films are then kept at 80° C. for ¼ hour. The copolymer films are clear, colorless, odorless and extremely tough.

We claim:

1. A fillerless, hydrolytically stable, biologically inert, transparent, oxygen transporting, polymeric, shaped article for use in biomedical applications comprising polymerizing a poly(organoparaffinsiloxane) monomer represented by the following formula:

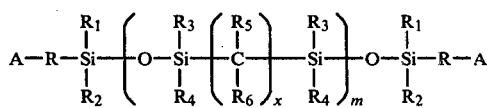

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

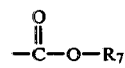

wherein $R_7$ is selected from the group consisting of a hydrocarbon group containing from 1 to about 12 carbon atoms and a carboxylic acid amide represented by the formula

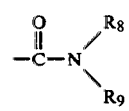

wherein $R_8$ and $R_9$ can be the same or different and each is selected from the group consisting of hydrogen and a hydrocarbon group containing from 1 to about 12 carbon atoms; x is 2 or greater and m is 1 or greater, forming a polymer in a crosslinked network.

2. The shaped article for use in biomedical applications according to claim 1 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and $R_1$, $R_2$, $R_3$ and $R_4$ are alkyl radicals having from 1 to 10 carbon atoms.

3. The shaped article for use in biomedical applications according to claim 2 wherein m is a number of from 1 to about 200.

4. The shaped article for use in biomedical applications according to claim 3 wherein m is a number from 1 to about 50.

5. The shaped article for use in biomedical applications according to claim 4 wherein m is a number from 1 to about 25.

6. The shaped article for use in biomedical applications according to claim 1 wherein x is a number from 2 to 3.

7. The shaped article for use in biomedical applications according to claim 1 is a contact lens.

8. A fillerless, hydrolytically stable, biologically inert, transparent, oxygen transporting, polymeric shaped article for use in biomedical applications comprising a poly (organoparaffinsiloxane) monomer represented by the following formula:

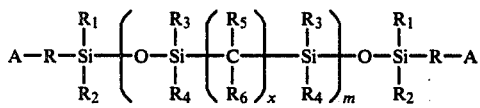

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

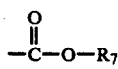

wherein $R_7$ is selected from the group consisting of a hydrocarbon group containing from 1 to about 12 carbon atoms and a carboxylic acid amide represented by the formula

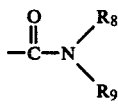

wherein $R_8$ and $R_9$ can be the same or different and each is selected from the group consisting of hydrogen and a hydrocarbon group containing from 1 to about 12 carbon atoms; x is 2 or greater and m is 1 or greater, copolymerized with one or more monomers selected from the group consisting of a lower ester of acrylic and methacrylic acid, styryls, and N-vinyl pyrrolidinone forming a copolymer in a crosslinked network.

9. The shaped article for use in biomedical applications according to claim 8 wherein the monomers are selected from the group consisting of tertiary butyl styrene, propyl styrene, styrene and N-vinyl pyrrolidone.

10. The shaped article for use in biomedical applications according to claim 8 wherein the monomer is selected from the group consisting of allyl methacrylate, butoxyethylmethacrylate, cyclohexyl methacrylate, ethyl methacrylate, methylmethacrylate, ethyl hexyl acrylate, n-butyl acrylate, butyl acrylate, N-vinyl pyrrolidinone, isobornyl acrylate, menthyl acrylate, adamantanyl acrylate and isopinocamphyl acrylate.

11. The shaped article for use in biomedical applications according to claim 8 wherein x is a number from 2 to 3.

12. The shaped article for use in biomedical applications according to claim 8 is a contact lens.

13. A fillerless, flexible, hydrolytically stable, biologically inert, transparent, resilient, soft, oxygen transporting, polymeric, shaped article for use in biomedical applications comprising polymerizing a poly(organosiloxane) monomer represented by the following formula:

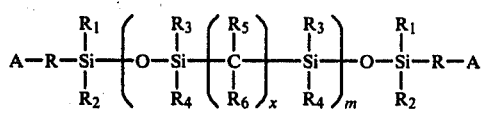

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

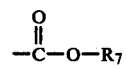

wherein $R_7$ is selected from the group consisting of a hydrocarbon group containing from 1 to about 12 carbon atoms and a carboxylic acid amide represented by the formula

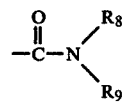

wherein $R_8$ and $R_9$ can be the same or different and each is selected from the group consisting of hydrogen and a hydrocarbon group containing from 1 to about 12 carbon atoms; x is 2 or greater and m is 1 or greater forming a polymer in a crosslinked network.

14. The shaped article for use in biomedical applications according to claim 13 wherein m is a number of from about 50 to about 800.

15. The shaped article for use in biomedical applications according to claim 14 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and $R_1$, $R_2$, $R_3$ and $R_4$ is an alkyl radical having from 1 to 10 carbon atoms.

16. The shaped article for use in biomedical applications according to claim 15 wherein the alkylene radical has from about 1 to about 4 carbon atoms.

17. The shaped article for use in biomedical applications according to claim 16 wherein the alkylene radical has from about 3 to about 4 carbon atoms.

18. The shaped article for use in biomedical applications according to claim 17 wherein $R_1$, $R_2$, $R_3$ and $R_4$ are selected from the group consisting of a methyl radical and a phenyl radical.

19. The shaped article for use in biomedical applications according to claim 18 wherein $R_1$, $R_2$, $R_3$, and $R_4$ are methyl radicals.

20. The contact lens according to claim 19 wherein $R_5$ and $R_6$ are selected from the group consisting of hydrogen and methyl.

21. The shaped article for use in biomedical applications according to claim 13 wherein x is a number from 2 to 3.

22. The shaped article for use in biomedical applications according to claim 13 is a contact lens.

23. A fillerless, flexible, hydrolytically stable, biologically inert, transparent, resilient, soft, oxygen transporting, polymeric, shaped article for use in biomedical applications comprising a poly(organosiloxane) monomer represented by the following formula:

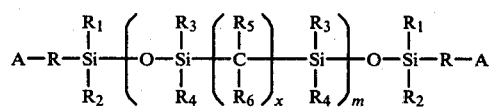

wherein A is an activated unsaturated group; R is a divalent hydrocarbon radical having from 1 to about 22 carbon atoms; $R_1$, $R_2$, $R_3$ and $R_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R_5$ and $R_6$ can be the same or different and are selected from the group consisting of hydrogen, a hydrocarbon radical containing from 1 to about 12 carbon atoms, a carboxylic acid group, a carboxylic acid ester group represented by the formula

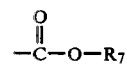

wherein $R_7$ is selected from the group consisting of a hydrocarbon group containing from 1 to about 12 carbon atoms and a carboxylic acid amide represented by the formula

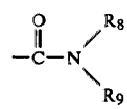

wherein $R_8$ and $R_9$ can be the same or different and each is selected from the group consisting of hydrogen and a hydrocarbon group containing from 1 to about 12 carbon atoms; x is 2 or greater and m is 1 or greater copolymerized with one or more monomers selected from the group consisting of a lower ester of acrylic and methacrylic acid, styryls, and N-vinyl pyrrolidone forming a polymer in a crosslinked network.

24. The shaped article for use in biomedical applications according to claim 23 wherein the monomers are selected from the group consisting of tertiary butyl styrene, propyl styrene, styrene and N-vinyl pyrrolidone.

25. The shaped article for use in biomedical applications according to claim 23 wherein the monomer is selected from the group consisting of allyl methacrylate, butoxyethylmethacrylate, ethyl hexyl acrylate, n-butyl acrylate, butyl acrylate and N-vinyl pyrrolidone, isobornyl acrylate, menthyl acrylate, adamantanyl acrylate and isopinocamphyl acrylate.

26. The shaped article for use in biomedical applications according to claim 25 wherein x is a number from 2 to 3.

27. The shaped article for use in biomedical applications according to claim 26 is a contact lens.

* * * * *

UNITED STATES PATENT AND TRADEMARK OFFICE
CERTIFICATE OF CORRECTION

PATENT NO. : 4,208,506
DATED : June 17, 1980
INVENTOR(S) : William G. Deichert, Kai C. Su, Martin F. vanBuren It is certified that error appears in the above-identified patent and that said Letters Patent are hereby corrected as shown below:

| | |
|---|---|
| Col. 2, line 49 | after the number 5 delete "or" and insert ---of---. |
| Col. 3, line 26 | after the number 63 delete "or" and insert ---of---. |
| Col. 4, line 2 | after the word reaction delete "during". |
| Col. 4, line 54 | after the number 139 delete "-148 81974)" and insert --- -148 (1974)---. |
| Col. 6, line 29 | in the formula delete "$CH_2$-Si-$CH_3$" and insert ---$CH_3$-Si-$CH_3$---. |
| Col. 9, line 12 | after the word greater delete "than" and insert ---and---. |
| col. 10, line 33 | in the chemical formula delete the upper "$R_9$" and insert ---$R_8$---. |
| col. 13, lines 20-25 | delete the formula " 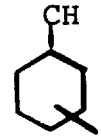 " and insert --- 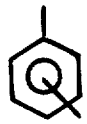 ---. |

UNITED STATES PATENT AND TRADEMARK OFFICE
CERTIFICATE OF CORRECTION

PATENT NO. : 4,208,506

DATED : June 17, 1980

INVENTOR(S) : William G. Deichert, Kai C. Su, Martin F. vanBuren

It is certified that error appears in the above-identified patent and that said Letters Patent are hereby corrected as shown below:

Col. 13, line 27  delete "n-vinyl-2-pyrrolidinone-x-yl" and insert --- N-vinyl-2-pyrrolidinone-x-yl---.

Col. 17, line 14  delete "tetrahydrofuryl" and insert --- tetrahydrofurfuryl ---.

Col. 18, line 8  after American delete "Academyl" and insert --- Academy ---.

Col. 19, line 9  after the symbol α delete "107" and insert --- ω ---.

Col. 19, line 41,
Col. 22, line 59 and
Col. 22, line 58  delete the term "$g/mm/mm^2$" and insert --- $g/mm^2$ ---.

Col. 20, line 10  after Wichterle insert --- 3,220,960 ---.

Col. 20, line 66  after 557 g insert --- of ---.

UNITED STATES PATENT AND TRADEMARK OFFICE
CERTIFICATE OF CORRECTION

PATENT NO. : 4,208,506

DATED : June 17, 1980

INVENTOR(S) : William G. Deichert, Kai C. Su, Martin F. vanBuren

It is certified that error appears in the above-identified patent and that said Letters Patent are hereby corrected as shown below:

Col. 25, lines 56-57,
Col. 28, line 22,
Col. 28, lines 28-29 and
Col. 28, lines 33-34
 after the word and delete "N-vinyl pyrrolidone" and insert -- N-vinyl pyrrolidinone --.

Signed and Sealed this

Sixteenth Day of September 1980

[SEAL]

Attest:

SIDNEY A. DIAMOND

Attesting Officer   Commissioner of Patents and Trademark